BEST AVAILABLE COPY

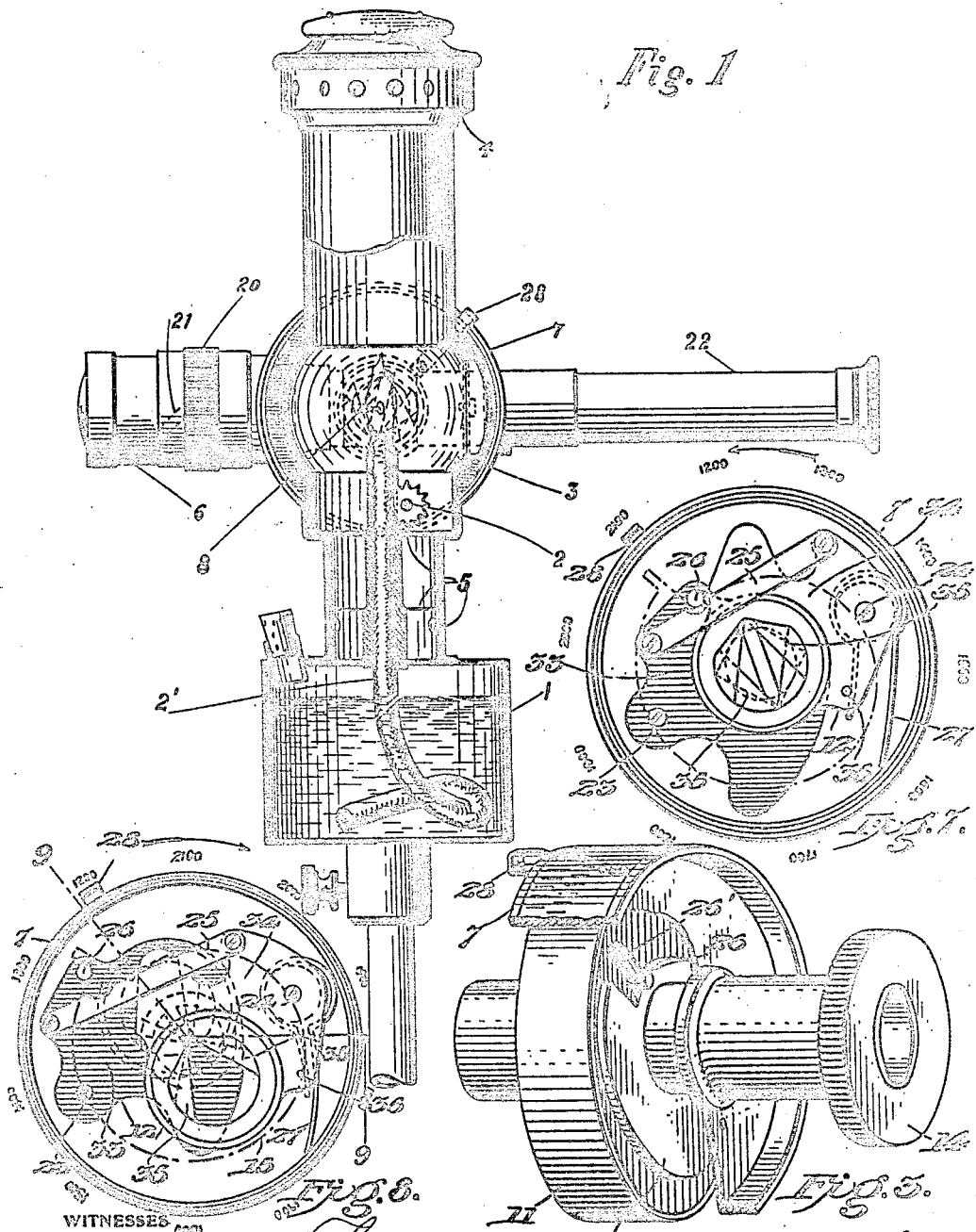

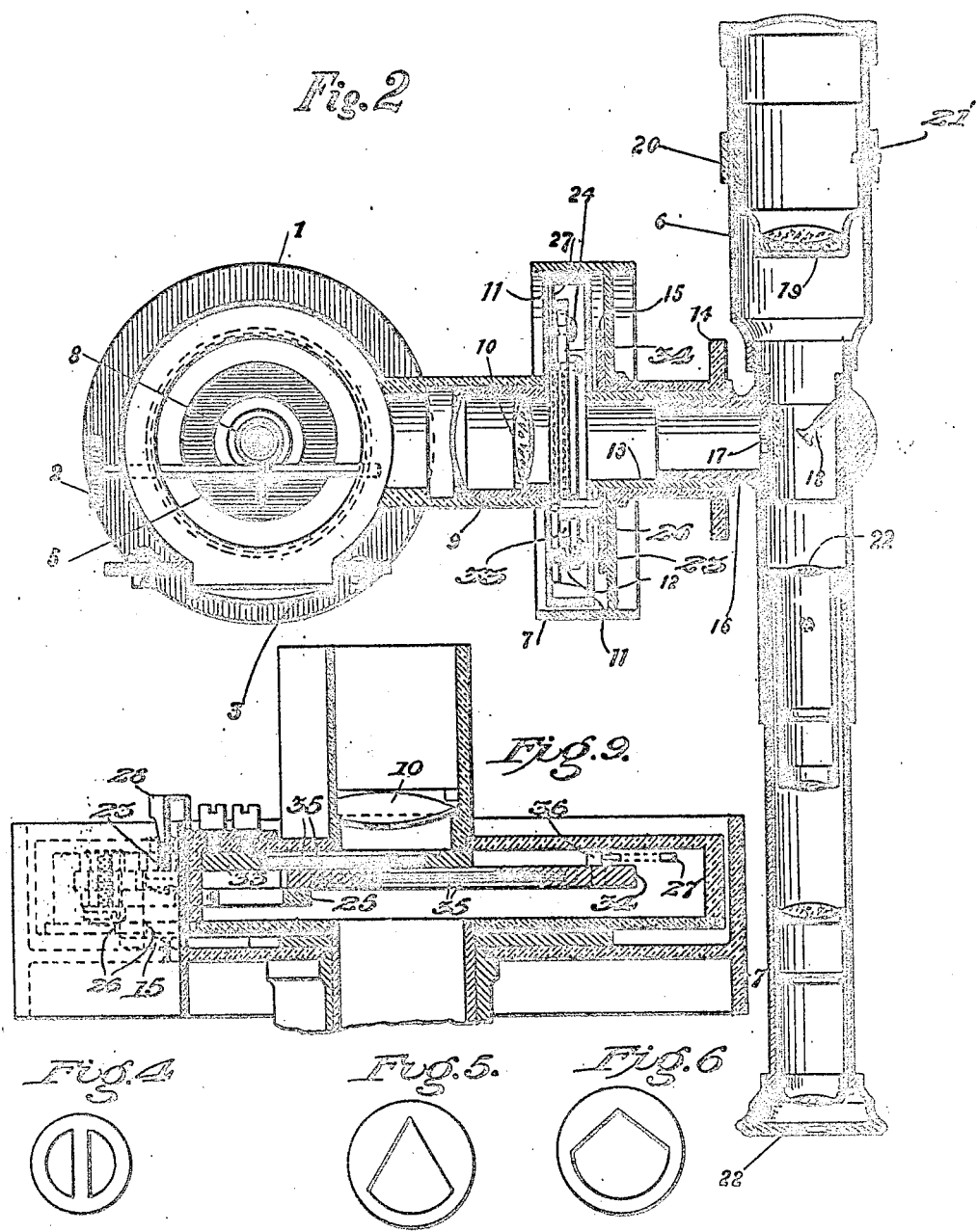

UNITED STATES PATENT OFFICE.

ALBERT F. SHORE, OF NEW YORK, N. Y.

OPTICAL TESTING INSTRUMENT.

1,044,584.

Specification of Letters Patent.   Patented Nov. 19, 1912.

Application filed April 14, 1911.   Serial No. 621,045.

*To all whom it may concern:*

Be it known that I, ALBERT F. SHORE, a citizen of the United States, residing at New York, in the county of New York and State of New York, have invented certain new and useful Improvements in Optical Testing Instruments, of which the following is a full, clear, and exact specification.

My invention relates to optical testing instruments and in one of its specific forms consists of means for measuring incandescent temperatures by comparison with a standard source of light.

My invention has for its object the provision of means for manipulating the light beam from the said standard source of light, whereby, through a suitable colored shutter or iris diaphragm, the light beam, acting on a reflector, permits accurate comparisons between the color of the incandescent bodies whose temperature is to be measured and the color of the illuminated reflector; means are also provided for registering said temperature on a scale. These and other objects are attained by my invention, which is illustrated in the accompanying drawings, forming a part of this specification, wherein—

Figure 1 is a partial sectional elevation of the preferred form of my invention. Fig. 2 is a sectional plan view, taken on a line central with the telescope shown in Fig. 1. Fig. 3 is a perspective view of the shutter mechanism case. Figs. 4, 5 and 6 show different forms of colored foil or glass, used in the shutter. Fig. 7 shows the shutter mechanism open wide. Fig. 8 shows the shutter mechanism nearly closed, and Fig. 9 is a cross-section of the main portion of the instrument, the section being taken in line 9—9 Fig. 8.

Referring to Fig. 1, 1 is an oil well; 2 is a knurled adjusting wheel for the wick 2'; 3 is a glass door to the burner chamber, to permit access to said chamber for lighting the wick, trimming same, and for observation of the size of the flame; 4 is the usual chimney and air baffle arrangement; 5 are baffle plates for the intake of air; 6 is a telescope, pivoted concentrically with the axis of the graduated scale 7 and the flame 8.

The construction is also clearly shown in Fig. 2, where 9 is the condensing lens tube, 10 the said lens, and 11 the shutter box carried by the tube 9; 12 is the shutter mechanism; 13 is a continuation of the tube 9 and forms a spindle for the knurled knob 14, rotary scale 7 and cam 15, while inside it is the bearing for the telescope pivot 16. Both are hollow to permit the focusing of the synthetic light beams from the flame 8 on to the transparent ground glass screen 17. 18 is a speculum, of preferably highly polished palladium; 19 is the wide angle objective; 20 a knurled ring, connected with the slidable objective holder, as by a screw 21' working in a spiral slot 21, Fig. 1. The shank of this screw follows the spiral grooves and serves to move forward or backward the objective 19, thus focusing it with the speculum or reflector 18 and the eye piece 22, Fig. 2.

The diaphragm shutter mechanism 12 (Figs. 7 and 8) consists of two swinging plates 33 and 34, provided with fringes of transparent colored foil or glass 35, 35 (Figs. 4, 5 and 6). Said swinging plates 33 and 34 are pivoted at 23 and 24 and connected together by the rod 25, so that when the cam-pin 26 is moved in the slot 26' by cam 15, the swinging plates of the shutter mechanism move in opposite directions. The plate 34 carries a pin 36, against which bears the spring 27 to move the rod 25, through the instrumentality of the plate 34, normally into contact with the connecting pin 26. By providing the adjustable diaphragm shutter with the fringes of transparent colored foil or glass 35, the light of the standard flame is made to correspond exactly with the light transmitted by the objects within the temperature range for which the instrument is designed. Fig. 7 shows the swinging plates 33 and 34 of the shutter mechanism open and apart, and Fig. 8 shows said plates together and almost closed. Figs. 4 and 6 show other forms of transparent colored foil or glass, used for providing the colored fringes on the swinging plates 33 and 34 of the shutter mechanism, as shown in Figs. 7 and 8. 28 is an indicator point attached to the shutter box 11, for indicating the temperature registered on scale 7.

The method of operation is as follows: The wick 2' is lighted through the glass fitted door 3, and the flame is regulated by the knurled wheel 2, after which the instrument is ready for measuring the temperature of any given object, in a furnace for instance By looking through the eye piece 22 of the telescope 6, at the object the temperatu of which is to be measured, focus is obtained in the usual way by turning the knurled ring 20 until the object is distinctly seen. The reflector or speculum 18 is in the path of vision and appears black while the shutter is closed. As the temperature of the object in the furnace rises, it becomes illumined and is observed through the eye piece in the telescope. As soon as the object is thus visible, the shutter mechanism is operated by means of the knurled knob 14, and which shutter mechanism permits the light beam to pass to the speculum 18, illuminating the same, after which the shutter mechanism is manipulated until the color or light of the speculum 18 is the same as that of the heated object. In actual practice, the shutter mechanism is operated so finely that the light or color of the speculum 18 is absorbed by the color of the heated object and is hardly perceptible through the eye piece 22. The instrument is so arranged that when the light or color of the speculum 18 is the same as that of the heated object, the indicator 28 registers the temperature of the heated object on the scale 7.

This invention may also be used by rotating the scale 7 to the temperature registration to which it is desired that the body which is to be measured shall be heated, and then removing said object from the furnace when the color thereof corresponds with the color of the speculum or reflector 18.

It will be understood that I do not limit myself to the exact construction and arrangement shown in the drawings and described and claimed in the specification, as it is obvious that variations and modifications in the construction and arrangement of parts and of the materials used, may be made and used without departing from the spirit and scope of my invention.

Having thus described my invention, what I claim as new and desire to secure by Letters Patent, is:

1. In an optical testing instrument, the combination with a telescope embodying a speculum in the field of rays of light from one source and through which telescope light from said source may be viewed, of means for simultaneously directing upon said speculum rays of light from a standard source of light for comparison with the rays from said first source, and means, embodying a rotary adjusting element, for varying in a predetermined manner the rays of light directed upon the speculum from said standard source.

2. In an optical testing instrument, the combination with a telescope embodying a speculum in the field of rays of light from one source and through which telescope light from said source may be viewed, of means for simultaneously directing upon said speculum rays of light from a standard source of light for comparison with the rays from said first source, and shutter mechanism, embodying a rotary adjusting element, for varying in a predetermined manner the rays of light directed upon the speculum from said standard source.

3. In an optical testing instrument, the combination with a telescope embodying a speculum in the field of rays of light from one source and through which telescope light from said source may be viewed, of means for simultaneously directing upon said speculum rays of light from a standard source of light for comparison with the rays from said first source, and shutter mechanism having a colored diaphragm for varying in a predetermined manner the color and intensity of the rays of light directed upon the speculum from said standard source.

4. In an optical testing instrument, the combination with a telescope embodying a speculum in the field of rays of light from one source and through which telescope light from said source may be viewed, of means for simultaneously directing upon said speculum rays of light from a standard source of light for comparison with the rays from said first source, shutter mechanism having a colored diaphragm for varying in a predetermined manner the color and intensity of the rays of light directed from the speculum from said standard source, and a condensing lens between the shutter mechanism and the standard source of light.

5. In an optical testing instrument, the combination with a telescope embodying a speculum in the field of rays of light from one source and through which telescope light from said source may be viewed, of means for simultaneously directing upon said speculum rays of light from a standard source of light for comparison with the rays from said first source, means for varying in a predetermined manner the rays of light in a predetermined manner the rays of light directed upon the speculum from said standard source, and means for registering the movements of such light-varying means.

6. In an optical testing instrument, the combination with a telescope embodying a speculum in the field of rays of light from one source and through which telescope light from said source may be viewed, of means for simultaneously directing upon said speculum rays of light from a standard source of light for comparison with the rays from said first source, means for varying a predetermined manner the rays of light directed upon the speculum from said standard source, and a scale and pointer the movable element of which is controlled in its movements by the movements of such light varying means.

7. In an optical testing instrument, the combination with a telescope embodying a speculum in the field of rays of light from one source and through which telescope light from said source may be viewed, of means for simultaneously directing upon said speculum rays of light from a standard source of light for comparison with the rays from said first source, an adjustable shutter mechanism for varying in a predetermined manner the rays of light directed upon the speculum from said standard source, and a scale and pointer the movable element of which is controlled in its movements by the adjustments of the shutter mechanism.

8. In an optical testing instrument, the combination with a telescope embodying a speculum in the field of rays of light from one source and through which telescope light from said source may be viewed, of means for simultaneously directing upon said speculum rays of light from a standard source of light for comparison with the rays from said first source, an adjustable shutter mechanism for varying in a predetermined manner the rays of light directed upon the speculum from said standard source said shutter mechanism including a rotary shutter-operating cam, and a scale and pointer the movable element of which is controlled in its movements by said cam.
9. In an optical testing instrument, the combination with a telescope embodying a speculum in the field of rays of light from one source and through which telescope light from said source may be viewed, of means for simultaneously directing upon said speculum rays of light from a standard source of light for comparison with the rays from said first source, an adjustable shutter mechanism for varying in a predetermined manner the rays of light directed upon the speculum from said standard source, and a ground glass screen through which said standard light passes to the speculum.

10. In an optical testing instrument, the combination with a telescope mounted to turn about an axis passing transversely through it and embodying a speculum in the field of rays of light from one source and through which speculum said axis passes, of means for simultaneously directing upon said speculum in any position of said telescope rays of light from a standard source of light for comparison with the rays from said first source.

In testimony whereof, I affix my signature, in presence of two witnesses.

ALBERT F. SHORE.

Witnesses:
HARRY H. THAYER,
WILLIAM DRAEMEL, Jr.

Copies of this patent may be obtained for five cents each, by addressing the "Commissioner of Patents, Washington, D. C."